| United States Patent [19] | [11] Patent Number: 4,762,737 |
| Lu | [45] Date of Patent: Aug. 9, 1988 |

[54] MULTI-LAYER NON-CORROSIVE PLASTIC FILM

[75] Inventor: Pang-Chia Lu, Pittsford, N.Y.

[73] Assignee: Mobil Oil Corporation, New York, N.Y.

[21] Appl. No.: 731,432

[22] Filed: May 7, 1985

[51] Int. Cl.$^4$ .................. B65D 30/02; B32B 27/08
[52] U.S. Cl. .................. 428/35; 428/476.1; 428/476.3; 428/476.9
[58] Field of Search .................. 428/35, 476.1, 476.3, 428/476.9

[56] References Cited

U.S. PATENT DOCUMENTS

| | | | |
|---|---|---|---|
| 3,496,061 | 2/1970 | Freshour et al. | 161/254 |
| 3,819,792 | 6/1974 | Ono et al. | 264/95 |
| 4,220,684 | 9/1980 | Olson | 428/35 |
| 4,284,672 | 8/1981 | Stillman | 428/461 |
| 4,363,841 | 12/1982 | Snow | 428/461 |
| 4,401,256 | 8/1983 | Krieg | 229/53 |
| 4,410,482 | 10/1983 | Subramanian . | |
| 4,416,942 | 11/1983 | DiLuccio . | |

FOREIGN PATENT DOCUMENTS 2045774 11/1980 United Kingdom .

Primary Examiner—John E. Kittle
Assistant Examiner—James J. Seidleck
Attorney, Agent, or Firm—Alexander J. McKillop; Michael G. Gilman; Stanislaus Aksman

[57] ABSTRACT

Disclosed is a multi-layer film comprised of at least one high density polyolefin (HDPE) layer, at least one polyamide layer and an HDPE/polyamide adhesion promoting agent. The agent is substantially free of inorganic salt groups and it is a non-ionic product of a polymerization reaction of a $C_2$–$C_6$ alpha-olefin with a monocarboxylic acid of the formula

R—COOH wherein R is an ethylenically unsaturated hydrocarbyl group.

16 Claims, No Drawings

MULTI-LAYER NON-CORROSIVE PLASTIC FILM

BACKGROUND OF THE INVENTION

1. Field of the Invention

This invention relates to a multi-layer film formed from at least two layers of dissimilar thermoplastic resins. More particularly, the invention is directed to a multi-layer film free of components corrosive to the processing equipment used to manufacture the film.

2. Description of the Prior Art

Multi-layer films made of polyamide and high density polyethylene (HDPE) are known in the art. For example, Olson, U.S. Pat. No. 4,220,684, discloses a coextruded laminated plastic bag employed to contain foods during storage and for reheating the foods prior to serving. The bag structure is comprised of two layers, the inner layer, in contact with the foodstuffs, formed from a high density polyethylene and the outer layer, in contact with the reheating vessel, formed from a relatively thin Nylon-6 film. The high density polyethylene layer also comprises a small amount of an adhesion promoter, such as ethylene-acrylic acid copolymers, wherein at least a portion of the acrylic acid groups are neutralized by an alkali metal ion. Such copolymers are commonly known in the art as ionomers.

Krieg, U.S. Pat. No. 4,401,256, also discloses a two-layer heat sealable film comprising a high density polyolefin containing a minor amount of an adhesion-promoting ionomer and a second polyamide layer.

Additionally, Ono et al, U.S. Pat. No. 3,819,792, Freshour et al, U.S. Pat. No. 3,496,061 and Smith, Great Britain patent application No. 2,045,774, also disclose the use of ionomer resins as adhesion-promoting agents for polyamides and high density polyethylene.

The ionomers were used in manfacturing such prior art multi-layer bag structures to promote the compatibility of the polyamide resin, e.g., Nylon, with the high density polyethylene resin. However, the salt-containing ionomers are very hygroscopic, cause foaming in the processing equipment, e.g., extruders, and promote corrosion of the processing equipment when the two layer films or bag structures made therefrom are manufactured.

SUMMARY OF THE INVENTION

A multi-layer film comprises:
(a) at least one high density polyolefin layer;
(b) at least one polyamide layer; and
(c) a sufficient amount of an agent, promoting the adhesion of the polyamide layer to the high density polyolefin layer, interposed between the high density polyolefin and the polyamide layers. The agent must be substantially free of inorganic salt groups and it comprises a non-ionic product of a polymerization reaction of at least one $C_2$–$C_6$ alpha-olefin with a monocarboxylic acid of the formula

R—COOH wherein R is an ethylenically unsaturated hydrocarbyl group.

DETAILED DESCRIPTION OF THE INVENTION

The high density polyolefin layer has a density of about 0.930 to about 0.960 g/cc, and it is comprised of polyethylene or a copolymer of ethylene with a higher alpha-olefin, e.g., 1-butene, 1-hexene or 1-octene. The higher alpha-olefin is present in the copolymer of ethylene with the higher alpha-olefin in the amount of less than about 10% by weight, preferably about 1 to about 8% by weight, and most preferably about 2% to about 6% by weight of the copolymer. The high density polyolefin layer can be manufactured by any process known to those skilled in the art from the above-identified monomers.

The polyamide layer of the multi-layer film is well known to those skilled in the art and it usually comprises condensation products containing recurring amide groups as integral parts of the copolymer chains. Polyamides are frequently referred to as "Nylons" and, although they are generally considered to be condensation polymers, they can also be formed by addition polymerization. Polyamides and their properties are generally described in the Kirk-Othmer Encyclopedia of Chemical Technology, 3rd Edition, Vol. 18, pages 328–371, John Wiley and Sons, New York (1982), the contents of the aforementioned passage being incorporated herein by reference. For the purposes of the present invention, the preferred polyamides used in the multi-layer film of the invention are selected from the group consisting of Nylon-6, Nylon-9, Nylon-11, Nylon-12, Nylon-6/6, Nylon-6/9, Nylon-6/10 and Nylon-6/12. The most preferred Nylon polymer used in the preparation of the multi-layer film of the present invention is Nylon-6. As is known to those skilled in the art, the above-enumerated Nylon polymers are manufactured and marketed under the respective tradenames by Allied Chemical Company, Morristown, N.J. and Custom Resins, Inc., a division of Bemis Company, Henderson, Ky.

The third component of the multi-layer film of the present invention is an agent promoting the adhesion of the high density polyolefin layer to the polyamide layer. Such an agent is a non-ionic product of a polymerization reaction of at least one $C_2$–$C_6$ alpha-olefin with a monocarboxylic acid of the formula

R—COOH wherein R is an ethylenically unsaturated hydrocarbyl group. The most preferred alpha-olefin is ethylene. Preferably, R is an ethylenically unsaturated $C_2$–$C_5$ hydrocarbyl group, and most preferably R is $H_2C=CH-$ or $$H_2C=C(CH_3)-.$$

None of the carboxylic acid groups of the agent is neutralized by an alkali metal ion. In this respect, the adhesion-promoting agent used in the preparation of the multi-layer film of the present invention is substantially chemically dissimilar from the ionomer resins used in prior art to promote the adhesion of high density polyolefin to polyamide. As is known to those skilled in the art, the ionomer resins used in prior art to promote the adhesion of a high density polyolefin layer to a polyamide layer had at least 10% of the carboxylic acid groups thereof neutralized by an alkali metal ion (e.g., see Freshour et al, U.S. Pat. No. 3,496,061, the entire contents of which are incorporated herein by reference). The adhesion-promoting agents of the present invention are unique, insofar as they are substantially free of such inorganic salt groups. The adhesion-promoting agents containing no inorganic salt groups are non-hygroscopic. Accordingly, during the process of manufacturing the multi-layer film, the formation of foam is decreased or substantially eliminated and the corrosion in the processing equipment, e.g., metal parts of the extruder coming into contact with the adhesion-promoting agent, is also decreased or substantially eliminated.

In preparing the non-ionic copolymers, the amount of the $C_2$–$C_6$ olefin used in the polymerization reaction mixture is about 80 to about 99 mole % and the amount of the monocarboxylic acid is from about 1 to 20% mole, and preferably it is about 1 to about 10 mole %. The manner of the preparation of the non-ionic copolymers is described in the aforementioned patent of Freshour et al, except, as will be apparent to those skilled in the art, the step of converting the base copolymers to ionic copolymers by reacting the copolymer with an anionizable alkali metal compound is omitted since the adhesion-promoting agents used herein must be substantially free of inorganic salt groups, such as the alkali metal ion groups. The adhesion-promoting agent is present in the final multi-layer film in the amount of about 2 to about 24%, preferably about 4 to about 14%, more preferably about 5 to about 12% and most preferably about 9% by weight.

The adhesion-promoting agent can be introduced between the layer of the high density polyolefin and the polyamide layer in any convenient manner. For example, the agent can be introduced in-between the two film layers during the coextrusion of the layers or it can be admixed either with the high density polyolefin or the polyamide resin in the respective separate extruders prior to the co-extrusion of the multi-layer film. Alternatively, it can be deposited on the pre-formed polyamide or the high density polyolefin layer and the two layers then laminated to each other by a suitable means, e.g., in a press exerting a pressure of at least 40 psi. In the preferred embodiment, the adhesion-promoting agent is combined with a pre-formed high density polyolefin layer in the amount of about 5 to about 25% by weight, preferably about 5 to about 15% by weight, and most preferably about 10% by weight of the high density polyolefin layer. Subsequently, the adhesion-promoting agent-containing HDPE layer is laminated to the polyamide layer on a Carver hydraulic press.

The adhesion-promoting agents are commercially available from a variety of sources. For example, DuPont ethylene-methacrylic acid copolymer resins are marketed under the trademark "Nucrel", while the Dow Chemical Company (hereinafter Dow) uses the trademark "EAA" copolymers or "Primacor" in marketing its own brand of the ethylene-acrylic acid resins.

The multi-layer film can be manufactured from two or more layers of the respective films, so long as it contains at least one layer of the HDPE and at least one layer of the polyamide separated by a small amount of the adhesion-promoting resin. In one embodiment, the multi-layer film comprises two outer layers of the HDPE containing the agent, separated by one layer of Nylon-6 film.

Although there is no practical limit imposed on the thickness of the multi-layer film, it is preferable that the film have a thickness of about 0.5 to about 10 mils, preferably from about 0.75 to about 5 mils. Typically, a composite film for manufacturing food bags will have a thickness of about 0.8 to about 1.5 mils. Similarly, although there is no limit imposed on the thickness of the HDPE and the polyamide layers, it is preferable to use the HDPE layers having a thickness of about 0.5 to about 5 mils, preferably about 0.8 to about 1.5 mils, and the polyamide layers having a thickness of about 0.1 to about 1 mil, preferably about 0.2 to about 0.5 mils.

The multi-layer film of the present invention is particularly suited for fabrication of bags used to contain foodstuffs to be heated to the preparation temperature in a liquid, such as water, or in a microwave oven. Such bags are generally manufactured by folding the film to form a U-shaped trough and then side-sealing both ends thereof to form a single bag or pouch. In use, a foodstuff to be prepared or reheated is placed inside of the pouch and the top of the pouch is closed by a suitable conventional means, e.g., a twist tie. In forming a bag of this construction, the polyolefin layer is positioned in such a manner that it comes into direct contact with the contents thereof. The outer layer is the polyamide film which comes into direct contact with the liquid in the cooking or reheating vessel or with microwave radiation in the microwave oven.

The following Examples further illustrate the essential features of the invention. However, it will be apparent to those skilled in the art that the specific reactants and reaction conditions used in the Examples do not limit the scope of the invention.

EXAMPLE 1

(Comparative HDPE/Nylon Film Without Adhesion Promoting Agent)

A multi-layer film used as a comparative standard was prepared from a high density polyethylene resin, available under the name of Marlex TR-130 from Phillips Chemical Company, and Nylon-6, available from Allied Chemical Company. Individual thin HDPE and Nylon films were produced independently with a ¾ inch Brabender extruder equipped with a six inch slit die. The two films were then laminated together using a Carver hydraulic press at 200° C. and 100 psi for one minute to make the composite film. No adhesion-promoting agent was used during the preparation of the composite film.

EXAMPLE 2

(Prior Art HDPE/Nylon Film with Ionomer Adhesion Promoting Agent)

A multi-layer film of the prior art was prepared from a high density polyethylene resin, available under the name of Marlex TR-130, from Phillips Chemical Company, Nylon-6 and an ionomer resin, marketed by the manufacturer, the E. I. DuPont and Company, under the name Surlyn 1705. The composite film was prepared as follows:

HDPE resin, mixed with 10% by weight of Surlyn 1705, was extruded into a 2 mil film as described in Example 1. Nylon film was also produced in the same manner. The two films were then laminated together on a Carver press to make the composite film.

EXAMPLES 3-4

(The Invention HDPE/Nylon Film With Non-Ionic Adhesion Promoting Agent)

Two multi-layer films of the present invention were prepared from the same high density polyethylene and nylon resins used in Examples 1 and 2, but non-ionic adhesion promoting agents were used to promote the adhesion of HDPE and nylon. In Example 3, the agent was a copolymer of ethylene and acrylic acid, available from Dow Chemical Company under the name EAA-459, while in Example 4 it was a copolymer of ethylene and methacrylic acid, available from DuPont under the name EMAA-910. The amounts of the HDPE, Nylon and the adhesion-promoting agents were: about 81%, about 10% and about 9%, respectively, for the films of both Examples, 3 and 4.

The procedure and the apparatus used to prepare the films were identical to those of Examples 1 and 2.

EXAMPLE 5

(Evaluation of Adhesion Bond Strength of the Films of Examples 1-4)

The strength of the adhesion bond of the films of Examples 1-4 was evaluated on an Instron Tensile Tester in accordance with the ASTM procedure known in the industry as the "peel test". The evaluation was conducted by peeling the high density polyethylene and Nylon layers apart by a "T" peel. The force required to separate the individual layers was measured and recorded. The results of the evaluation are summarized below in Table A.

TABLE A

| Film of Example | Adhesion Promoting Additive | Adhesion Between HDPE and Nylon (g/in) |
| --- | --- | --- |
| 1 | None | 40 |
| 2 | Surlyn 1705 | 740 |
| 3 | EAA - 459 | 700 |
| 4 | EMAA - 910 | 1000 |

The data of Table A indicates that EAA-459 is substantially similar to Surlyn 1705 as an HDPE/Nylon adhesion-promoting agent, while EMAA-910 is a superior HDPE/Nylon adhesion-promoting agent.

The corrossion-causing properties of the three additives were also tested in the following manner. The individual additives were laminated onto a square 3×3 inches clean steel Q-panel (made from No. R 612 plate obtained from Q-Panel Company, 26200 First Street, Cleveland, Ohio 44145) with a Carver press at 160° C. for 5 minutes. The polymer coatings on the panels were carefully removed. The panels were then stored in a high humidity chamber for three days. The areas on each panel which were covered with rust were compared and summarized below in Table B.

TABLE B

| Panels Treated By | Areas Covered With Rust |
| --- | --- |
| None | A few tiny spots |
| EMAA - 910 | A few tiny spots |
| EAA - 459 | ½ of the total area |
| Surlyn 1705 | ½ of the total area |

The data of Table B indicates that, of the three agents tested, EMAA-910 is least corrosive to metal, and EAA-459 is less corrosive than Surlyn 1705.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

What is claimed is:

1. A multi-layer film comprising:
   (a) at least one high density polyolefin layer;
   (b) at least one polyamide layer; and
   (c) a minor amount of an agent promoting the adhesion of the polyamide layer to the high density polyolefin layer, the agent being substantially free of inorganic salt groups and comprising a non-ionic product of a polymerization reaction of at least one $C_2$-$C_6$ alpha-olefin with methacrylic acid.

2. A film of claim 1 wherein the $C_2$-$C_6$ alpha-olefin is ethylene.

3. A film of claim 2 wherein the high density polyolefin layer is comprised of a polyolefin having a density of about 0.930 to about 0.960 g/cc.

4. A film of claim 3 wherein the polyamide layer is selected from the group consisting of Nylon 6, Nylon 9, Nylon 11, Nylon 12, Nylon 6/6, Nylon 6/9, Nylon 6/10 and Nylon 6/12.

5. A film of claim 4 wherein the amount of the agent in the film is about 2% to about 24% by weight, based on the total weight of the film.

6. A film of claim 5 wherein the amount of the agent in the film is about 4% to about 14% by weight based on the total weight of the film.

7. A film of claim 6 wherein the amount of the agent in the film is about 5 to about 12% by weight, based on the total weight of the film.

8. A film of claim 7 wherein the amount of the agent in the film is about 9% by weight based on the total weight of the film.

9. A thermoplastic bag which comprises at least one high density polyolefin layer, at least one polyamide layer, and a minor amount of an agent promoting the adhesion of the polyamide layer to the high density polyolefin layer, the agent being substantially free of inorganic salt groups and comprising a non-ionic product of a polymerization reaction of a $C_2$-$C_6$ alpha-olefin with methacrylic acid.

10. A thermoplastic bag of claim 9 wherein the $C_2$-$C_6$ alpha-olefin is ethylene.

11. A thermoplastic bag of claim 10 wherein the high density polyolefin layer is comprised of a polyolefin having a density of about 0.930 to about 0.960 g/cc.

12. A thermoplastic bag of claim 11 wherein the polyamide layer is selected from the group consisting of Nylon 6, Nylon 9, Nylon 11, Nylon 12, Nylon 6/6, Nylon 6/9, Nylon 6/10 and Nylon 6/12.

13. A thermoplastic bag of claim 12 wherein the amount of the agent is about 2% to about 24% by weight.

14. A thermoplastic bag of claim 13 wherein the amount of the agent is about 4% to about 14% by weight.

15. A thermoplastic bag of claim 14 wherein the amount of the agent in the bag is about 5 to about 12% by weight.

16. A thermoplastic bag of claim 15 wherein the amount of the agent is about 9% by weight.

* * * * *